United States Patent [19]

Greschat et al.

[11] 3,962,582

[45] June 8, 1976

[54] X-RAY IMAGE INTENSIFIER HAVING INPUT SCREEN WITH CARBON LAYER

[75] Inventors: Walter Greschat, Dormitz; Wolfgang Schubert, Erlangen-Frauenaurach, both of Germany

[73] Assignee: Siemens Aktiengesellschaft, Erlangen, Germany

[22] Filed: Nov. 14, 1974

[21] Appl. No.: 523,796

[30] Foreign Application Priority Data

Dec. 17, 1973 Germany............................ 2362761

[52] U.S. Cl................................... 250/483; 250/486

[51] Int. Cl.$^2$............................................ G01J 1/58

[58] Field of Search.............. 250/483, 486, 213 VT

[56] References Cited

UNITED STATES PATENTS

| | | | |
|---|---|---|---|
| 2,700,116 | 1/1955 | Sheldon | 250/213 VT |
| 3,443,104 | 5/1969 | Niklas | 250/213 VT |
| 3,697,795 | 10/1972 | Braun et al. | 250/213 VT X |
| 3,838,273 | 9/1974 | Cusano | 250/483 X |

*Primary Examiner*—Davis L. Willis
*Attorney, Agent, or Firm*—Haseltine, Lake & Waters

[57] ABSTRACT

An X-ray image amplifier or intensifier and, more particularly, an input screen for electron-optical image intensifiers having a phosphorescent or luminescent layer supported on a carrier, which is followed by a photocathode layer, and wherein a dark-colored intermediate layer is located between the luminescent layer and the photocathode layer. The darkly-colored layer employed between the luminescent layer and the photocathode layer is constituted of an at least approximately uniform surface coating of carbon or graphite facilitating the partial transmission of the light from the luminescent layer.

3 Claims, 3 Drawing Figures

X-RAY IMAGE INTENSIFIER HAVING INPUT SCREEN WITH CARBON LAYER

FIELD OF THE INVENTION

The present invention relates to an X-ray image amplifier or intensifier and, more particularly, to an input screen or window for electron-optical image intensifiers having a phosphorescent or luminescent layer supported on a carrier, which is followed by a photocathode layer, and wherein a dark-colored intermediate layer is located between the luminescent layer and the photocathode layer.

DISCUSSION OF THE PRIOR ART

Image intensifiers of the above-mentioned type are known, to some extent from German Laid-Open Pat. No. 1,957,152. Arrangements of that type are utilized for the direct visualization of X-ray images, for example, in the medical diagnosis. X-ray image intensifiers, however, may also be employed as the input stage for further image intensification or, respectively, for the conversion into other signals, such as video signals. As a rule, the output screen or window is constructed as a luminescent screen which may be observed directly, or through the intermediary of optical or video means. However, for effecting the conversion into video signals it is also usual for image intensifiers to have the output screen concurrently form the scanning target of a video installation.

In known X-ray image intensifiers, the so-called input screen, as a rule, consists of the combination of a fluorescent layer and a photocathode layer. The fluorescent layer herein contains luminescent material which emits light upon being stimulated by X-rays, and the photocathode layer contains a material which, in response to the influence of the fluorescent light, emits electrons in dependence upon the intensity of this light. These electrons may then, in a known manner, be electron-optically reduced, and acceleratedly reproduced on a further luminescent screen which then emits light under the effect of the electrons. The input screen, with which the present invention concerns itself, has been exclusively so constructed for a considerable length of time, in that the luminescent layer is applied to one side of a glass carrier, and the photocathode layer to the other side thereof. In some instances, there is increasingly omitted the separating layer of glass, and another intermediate layer is utilized, for example, until the photocathode layer is directly superimposed on the luminescent layer. The luminescent material is consequently located on the suitably shaped inner wall of the input aperture or window of the vacuum bulb, or on a special carrier. The last-mentioned carrier may, for example, in X-ray image intensifiers also consist of opaque, but X-ray permeable materials, such as metals, for example, aluminum. In particular, in photocathodes having large diameters, and upon the occurrence of large photoelectron flows, in known installations there has been encountered an electron-optical defocusing.

In the arrangement pursuant to the above-mentioned German Laid-Open Pat. No. 1,957,152, there is provided a barrier between the scintillator and the photocathode for the reduction of reaction or induction effects between the scintillator and the photocathode, in particular at relatively high X-ray outputs, for example, 30 milliroentgen for each minute and higher, for preventing the thereby observed progressive defocusing of the electron image, in which the barrier consists of oxidized vanadium, overwhelmingly by weight. Hereby there should be obtained an improved barrier between an alkali-halogenide scintillator and an alkali-antimonide photocathode, which will prevent any ascertainable defocusing of the X-ray image, without causing any concurrent noticeable reduction in sensitivity. Metals, such as platinum and aluminum, have not led to the desired results. on the other hand, there is caused the effect that the vanadium-pentoxide becomes naturally red-yellow and, consequently, can be applied only in extremely thin layers of approximately 2 to 20 mm, when the optical transmission of the barrier may not drop below a permissible value.

SUMMARY OF THE INVENTION

Accordingly, it is an object of the present invention to formulate an X-ray image intensifier, in accordance with which the focusing of the electrons is improved, in particular for high X-ray outputs. The foregoing object is inventively achieved in that a darkly-colored layer which is employed between the luminescent layer and the photocathode layer is constituted of an at least approximately uniform surface coating of carbon or graphite, thereby facilitating the partial transmission of the light from the luminescent layer.

The invention proceeds from the assumption that it is important for the delivery of the electron image from the inlet screen, to avoid charging of the emissive layer and to thereby produce any electronic defocusing. The foregoing can apparently be achieved when a sufficient amount of electrons is transmitted to the photocathode layer.

In accordance with an earlier proposal the foregoing has been achieved in that, prior to the application of the photocathode layer of the input screen or window, a light-permeable metal layer is applied to the fluorescent layer. By means of this application of thin intermediate metal layers, as ascertained through the results of measurements, the transverse conductivity, meaning the electron supply, is increased while concurrently there is an improvement in the yield of the photoelectrons.

In accordance with the inventive utilization of carbon in lieu of metal, the advantages which are attainable with metal layers are already achieved at an absorption of 20 to 30%, corresponding to a transmission of 70 to 80% of the light obtained from the input screen. When employing intermediate metallic layers, this is first attainable at a light loss of 30 to 70%.

In an embodiment of the invention, through the utilization of cesium iodide (CsI) as the fluorizing material and with alkali-, in particular cesium antimonide ($Cs_3Sb$), being employed as the photocathode material, particularly effective has been the novel use of light-transmissive layers which are constituted of carbon, and which produce an absorption of only 20 to 30% of the fluorescent light. The thickness of the layer of carbon, however, is not extremely critical. Even for layers which effect an increase in the electrical conductivity and which have an absorption of approximately 15%, there is achieved an improvement within the context of the invention, as well as with layers which allow for a transmission of only about 50%. Care should only be exercised that, by means of the intermediate layer there is achieved the effect of the invention, meaning an improved electron yield, and thereby still not too much light is lost. Thereby is attained, for example, a resolution which is usually reached for an X-ray output of 2 to 3 milliroentgen for each second (mR/s), even at 16 mR/s.

The manufacture of a combination which is formed of a luminescent screen and photocathode wherein, in the inventive manner, there is employed a thin layer of carbon, may be carried out with a sufficient degree of precision by means of vapor deposition or coating. In an applicable vapor deposition arrangement, the vaporization of the carbon may be carried out by bombarding a rigid graphite element with electrons. A largely uniform distribution of the vapor deposited carbon is obtained in a simple manner when the vaporization location for the carbon material is spaced at a distance of approximately 300 mm from the luminescent screen which is to be vapor coated, and in which the screen is rotated during the vapor deposition. The sequence of the vapor deposition or coating may be followed, and as warranted controlled in that a test glass is subjected to the vapor deposition procedure in coincidence with that of the luminescent screen. For the measurement thereof there may be employed the resultant variable electrical conductivity between two aluminum strips, and in which the conductivity is measured by an ohmeter. Similarly, the light transmissibility of the test glass may be monitored and controlled so as to form the measure for the thickness of the layer or, respectively, the conductivity of the layer. Also through the maintenance of predetermined vapor depositing conditions and periods, it is possible to achieve reproducible results.

A particularly good result is achieved for luminescent screens with electrically conductive materials, such as metal and, in particular aluminum carriers, in that the vapor deposition with graphite is carried out by means of argon at a pressure of $5 \times 10^{-5}$ torr. In this process it is assumed that the supply of electrons to the photocathode layer is particularly good, since the electrically conductive layer of carbon operates through slits which are provided in the luminescent layer, in effect, through the contacting of the metallic and, consequently, electrically conductive carrier.

BRIEF DESCRIPTION OF THE DRAWINGS

Further advantages and details of the invention may now be more closely ascertained from the following described exemplary embodiments, taken in conjunction with the accompanying drawings; in which.

DETAILED DESCRIPTION

Figure 1:
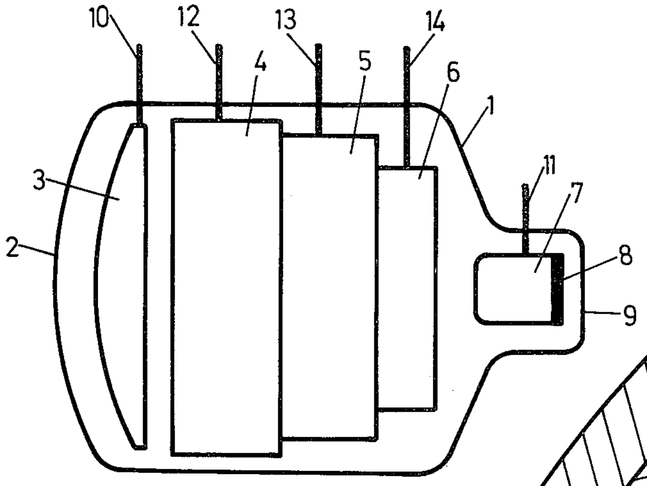
FIG. 1 illustrates, in cross-section, a generally schematically represented X-ray image intensifier.

Referring now in detail to FIG. 1 of the drawings, there is illustrated a vacuum-tight bulb 1, behind an end wall 2 of which there is positioned a luminescent screen-photocathode arrangement 3 constituting an input screen or window. Located in sequence, concentrically to the bulb 1 and to the arrangement 3, are electrodes 4, 5, 6 and 7. Connected to the electrode 7 is an output screen 8, the latter of which is located in front of an end window 9 provided in the second end wall of the bulb 1. By means of conductors 10 through

14 there are applied the individual inherently known voltages to the electrical components 3 through 8 of the image intensifier, so that the electrons which are emitted from the arrangement 3 are reproduced on the screen or window 8, and the thus formed illuminated image thereby becomes observable through the window 9.

Figure 2:
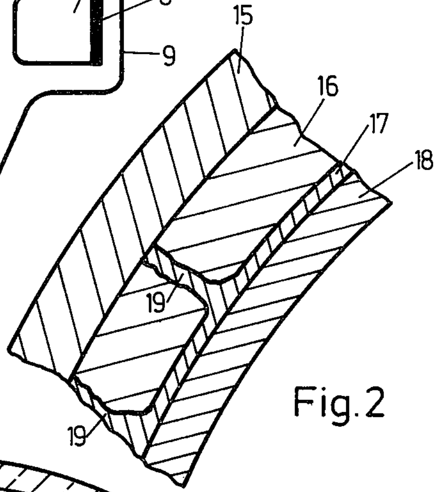
FIG. 2 shows an enlarged sectional detail of the input screen of the image intensifier of FIG. 1.

The enlarged section taken from FIG. 1 and shown in FIG. 2 illustrates that the input screen or window 3 consists of a carrier 15 having the concave surface thereof facing towards the interior of the bulb 1, and is constituted of an 0.5 mm thick aluminum sheet. On the inner side of the approximately spherically cup-shaped carrier 15 there is located a 0.15 mm thick luminescent layer 16 which is formed of CsI (cesium iodide). The latter layer is coated with a further layer 17 formed from graphite, and which is then followed by an approximately 30 mm thick layer 18 constituted of the photoemitting material $SbCs_3$ (cesium antimonide).

The operative effect of the layer 17 consists of in that it assists the layer 18 in the supply of electrons which are conveyed to the arrangement 3 through the conductor 10. In the arrangement according to the invention, during vapor deposition there is maintained an argon pressure of $1 \times 10^{-4}$ torr. Consequently, there are also formed in the slits in the luminescent material layer 16, as indicated at locations 19, conductive bridges which are constituted from graphite, so as to provide additional contacts with the photocathode layer 18 and to thereby, as may be readily comprehended, increase the yield of electrons.

Figure 3:
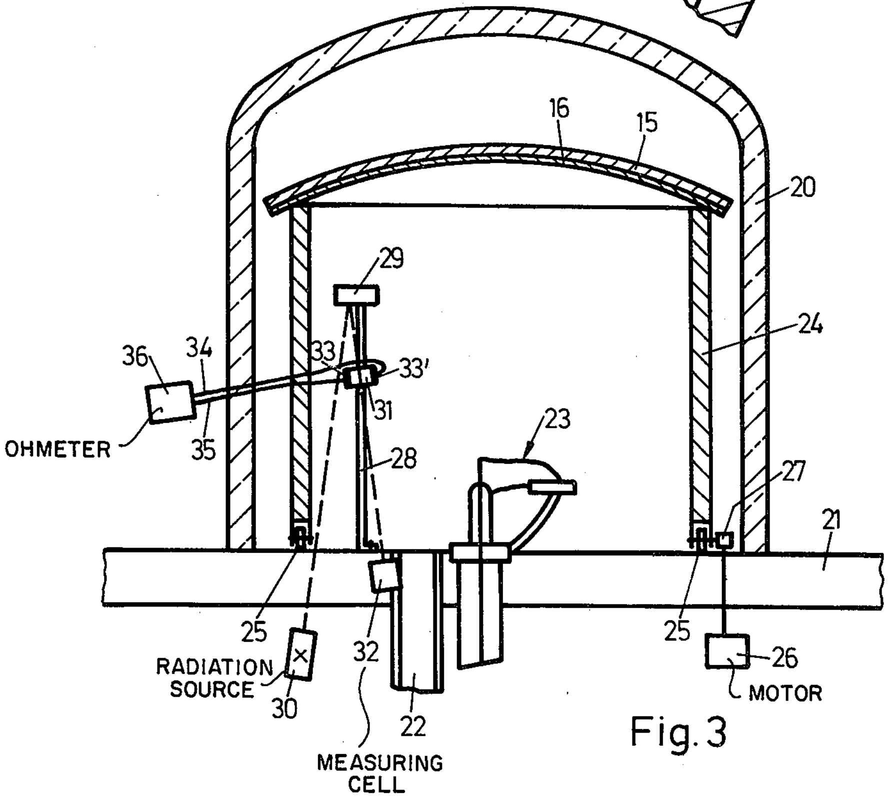
FIG. 3, in section, schematically illustrates the construction of an installation pursuant to which an intermediate layer formed from graphite may be uniformly vapor deposited on a luminescent layer.

Referring to FIG. 3 of the drawing, there is illustrated a vacuum installation for the vapor deposition of the graphite, which encompasses a vacuum-tight bell jar 20 positioned on a plate 21, through the latter of which there is led a suction conduit 22 for effecting the evacuation of the bell jar 20. Positioned in the lower center portion of the bell jar is a graphite vaporizer 23, opposite which there is located the spherical cup 15 so as to form the carrier for the luminescent layer 16. The cup is supported by a cylindrical upright 24 which rests on wheels 25 and is adapted to be placed into rotation through intermediary of the friction wheel 27, by means of motor 26. In order to be able to follow the sequence of the vapor deposition there is provided a mirror 29 mounted on a support 28, the latter of which is located on table 21, and against which there is directed the light of a radiation source 30 so as to be reflected through a probe glass 31, and which is then adapted to be measured in a measuring cell 32. Accordingly, the vapor deposition or coating sequence may be followed by means of the changing degree of light absorption which is caused by the coating of the test glass. The test glass may, however, be additionally or exclusively provided with conductive coatings 33, 33' on the sides thereof, and which are connected with an ohmeter 36 through conductors 34, 35. Thus, this will allow for observation of the electrical conductivity of the layer of carbon which is concurrently deposited on the fluorescent screen and on the measuring glass.

The operative effect of the installation is based on that the carbon vapor generated in the vaporizer 23 additionally coats with graphite the cup-shaped 0.5 mm thick aluminum sheet on the concave side thereof, which the latter of has previously been coated with approximately 150 $\mu$m thick luminescent material cesium iodide. After the coating with graphite is terminated at an indication of a conductivity of approximately 200 k Ω on the ohmeter 36, the luminescent screen may be removed from the installation, and then built into an image intensifier bulb 1 pursuant to FIG. 1. Therein there is then effected, in a known manner, the final completion of the photocathode through the application of the photocathode layer 18 by means of vapor deposition of the respective materials.

While there has been shown what is considered to be the preferred embodiment of the invention, it will be obvious that modifications may be made which come within the scope of the disclosure of the specification.

What is claimed is:

1. In an imput screen for electron-optical image intensifiers including a carrier; a luminescent layer on said carrier; a photocathode layer superimposed on said luminescent layer; and a dark-colored intermediate layer being interposed between said luminescent layer and said photocathode layer, the improvement comprising; said dark-colored intermediate layer being constituted of an at least approximately uniform surface coating layer of carbon for the partial transmission of light from said luminescent layer.

2. An input screen as claimed in claim 1, said carbon layer having a transmissiveness of 50 to 85%.

3. An input screen as claimed in claim 2, said transmissiveness being in the range of 70 to 80%.

* * * * *